United States Patent
Jones

[11] 3,904,154
[45] Sept. 9, 1975

[54] SECURING SYSTEM FOR JET ENGINE TESTING OF AIRCRAFT

[75] Inventor: Frederick W. Jones, Upper Marlboro, Md.

[73] Assignee: The United States of America as represented by the Secretary of the Navy, Washington, D.C.

[22] Filed: May 13, 1974

[21] Appl. No.: 469,187

[52] U.S. Cl. 244/110 R; 105/368 T; 114/43.5 AC; 244/114 R; 244/115; 280/179 R
[51] Int. Cl.² B60P 7/08; B63B 35/50; B64F 1/12; B65J 1/22
[58] Field of Search 9/46; 114/43.5, 75; 244/63, 110 R, 110 E, 114 R, 115; 105/368 S, 368 T; 280/179 R, 179 A, 193; 248/119 R, 361 R, 361 A

[56] References Cited
UNITED STATES PATENTS
1,402,496  1/1922  Hoffman ............................ 114/218
2,962,245  11/1960  Molzan et al. ..................... 244/115

FOREIGN PATENTS OR APPLICATIONS
1,026,519  1953  France ............................... 114/75

Primary Examiner—Trygve M. Blix
Assistant Examiner—Sherman D. Basinger
Attorney, Agent, or Firm—R. S. Sciascia; P. Schneider; W. Sheehan

[57] ABSTRACT

An anchoring device secures jet aircraft to a carrier during full power testing of the engine. A chock-like fitting is adapted to be secured flush with the upper surface of the deck of an aircraft carrier to be used for a tie down of aircraft undergoing full power engine run-up testing. The chock-like fitting includes a pivotally attached cover plate which closes over the chock at a level flush with the deck when the chock is not in use. When open, the cover plate exposes a slot-type aperture leading to a receiving cavity below the carrier deck. The aircraft attachment comprises a T-bar which is inserted into the fitting aperture and rotated 90° to position it within the receiving cavity.

3 Claims, 5 Drawing Figures

SECURING SYSTEM FOR JET ENGINE TESTING OF AIRCRAFT

BACKGROUND OF THE INVENTION

Previous methods of securing an aircraft on board a carrier during testing of the aircraft engine involved the use of an adapter which secured the aircraft to a cross bar type deck fitting or to a stationary anchor protruding above the deck. With the addition of more powerful jet aircraft to the fleet, this cross bar type method did not provide the strength necessary to restrain the aircraft. In addition, the cross bar type deck fitting is not easily disassembled and this type of construction as with stationary protruding anchors, present a potential hazzard on the deck of the carrier when not in use.

SUMMARY OF THE INVENTION

An object of the invention is to provide an improved anchoring system for aircraft which may be easily assembled and disassembled, and which is strong, easy to operate and relatively inexpensive compared to known systems.

This object as well as others are accomplished by a two-part anchoring system of the present invention. The first part comprises a fitting which is installed in the deck of a carrier, flush with its upper surface. The fitting includes a cover which opens to expose a slot type aperture leading to a receiving cavity. The second part comprises a T-bar which is inserted through the slot type aperture into the cavity. The t-bar is rotated 90° and wedged into a seat formed within the cavity. When so positioned, a multi-point contact exists between the T-bar and fitting so that the tension forces are distributed throughout the fitting. A chain is used to connect the T-bar to the aircraft.

BRIEF DESCRIPTION OF THE DRAWINGS

Other objects, advantages and novel features of the present invention will become apparent from the following detailed description of the invention when considered in conjunction with the accompanying drawings, in which.

The portion of the invention which is installed in the carrier is shown in FIGS. 1–3. Throughout the figures of the drawing like numerals indicate the same parts.

Figure 1:
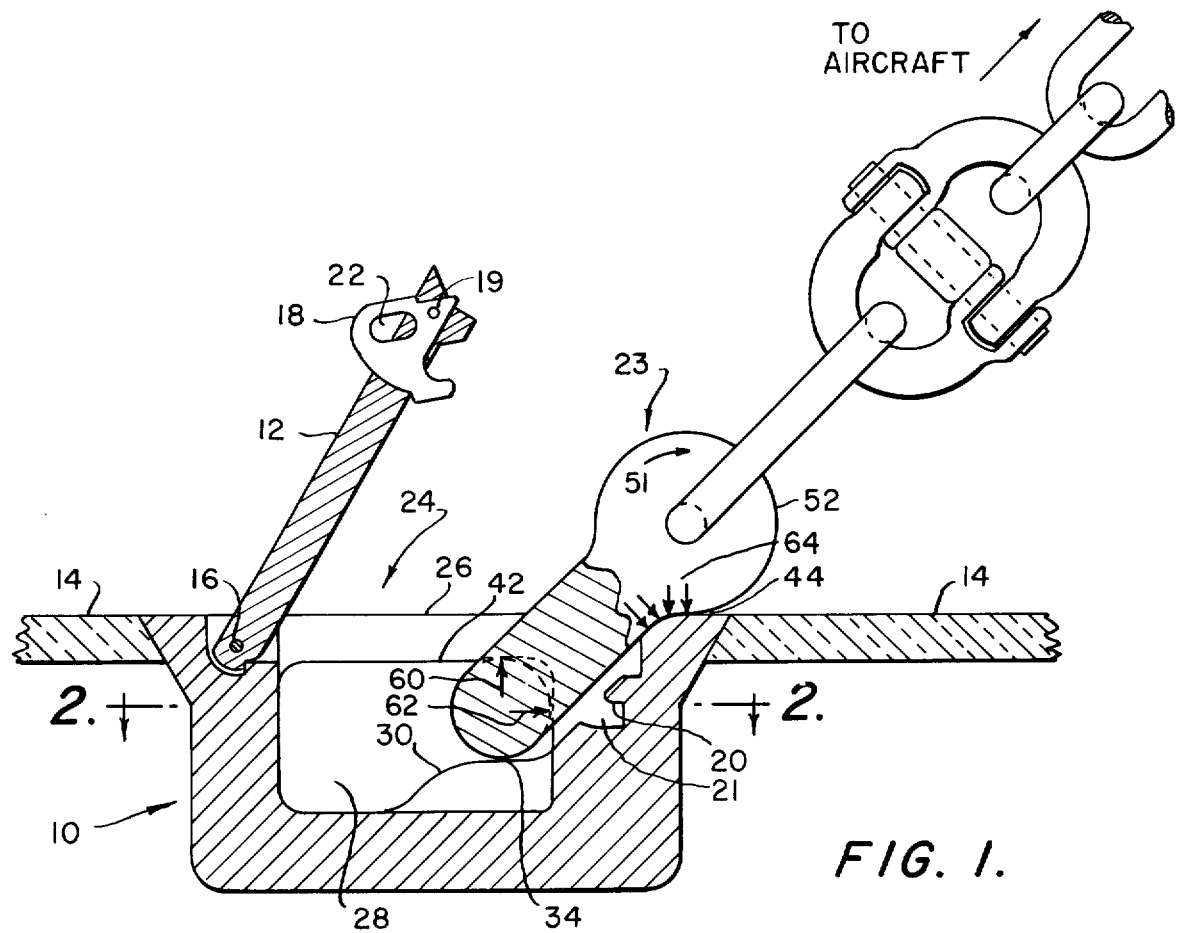
FIG. 1 is a partial cross-sectional view of a fitting and T-bar assembly installed in the deck of a carrier in accordance with the present invention.

In the drawing, and particularly FIG. 1, there is shown a cupshaped deck fitting 10 having a rotatable cover 12, shown in an opened position, which is installed within a deck 14 of and aircraft carrier. The fitting 10 is welded in the carrier deck and is capable of withstanding tension forces well in excess of those which could be exerted by an aircraft. The cover 12 of the fitting 10 rotates about a pivot 16 and automatically locks in its closed position by virtue of a spring biased latch 18 on cover 12 which pivots about pin 19 and engages an upper surface 20 of a slot 21 in the deck fitting 10. The latch 18 has an aperture 22 to permit gripping of the latch by a finger inserted therethrough. A T-bar 23 is shown seated in its appropriate position within the fitting 10 and a detailed description of the T-bar will be given later in the discussion of FIGS. 4 and 5. When in the position shown in FIG. 1, cover 12 is opened exposing a slot-type opening 24 in the top plate 26, which leads to a generally rectangular cavity 28 within fitting 10.

Figure 2:
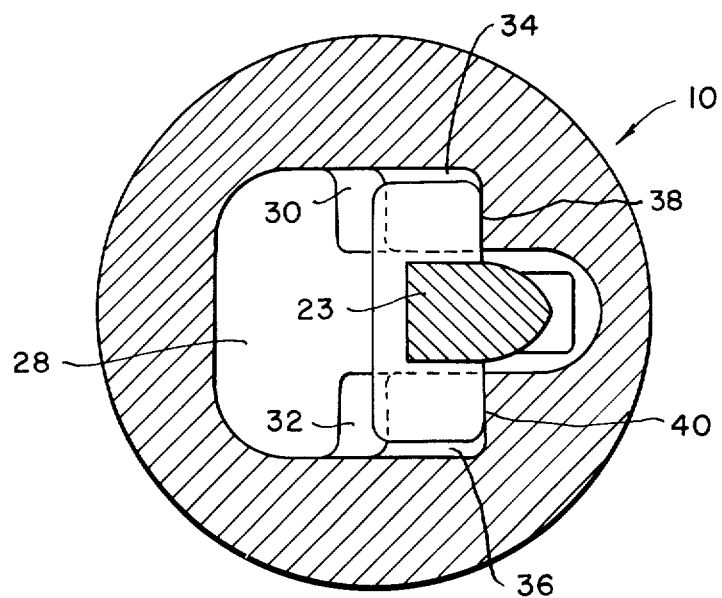
FIG. 2 is a top cross-sectional view of the invention taken along lines 2—2 of FIG. 1.

As can be seen more clearly from a comparison of FIGS. 1 and 2, along two corners of the cavity 28, inclines 30 and 32 provide a smooth entry to corresponding chock-like seats 34 and 36. When in the position shown in FIG. 1, T-bar 23 engages the fitting 10 along a number of different surfaces, i.e. the top surfaces of seats 34 and 36, side walls 38 and 40 (FIG. 2), the under surface 42 (FIG. 1) of top plate 26, and an area 44 (FIG. 1) on the right top surface of the fitting. Distribution of the forces in this manner minimizes the force exerted on the fitting at any given point when the aircraft engines are being tested.

Figure 3:
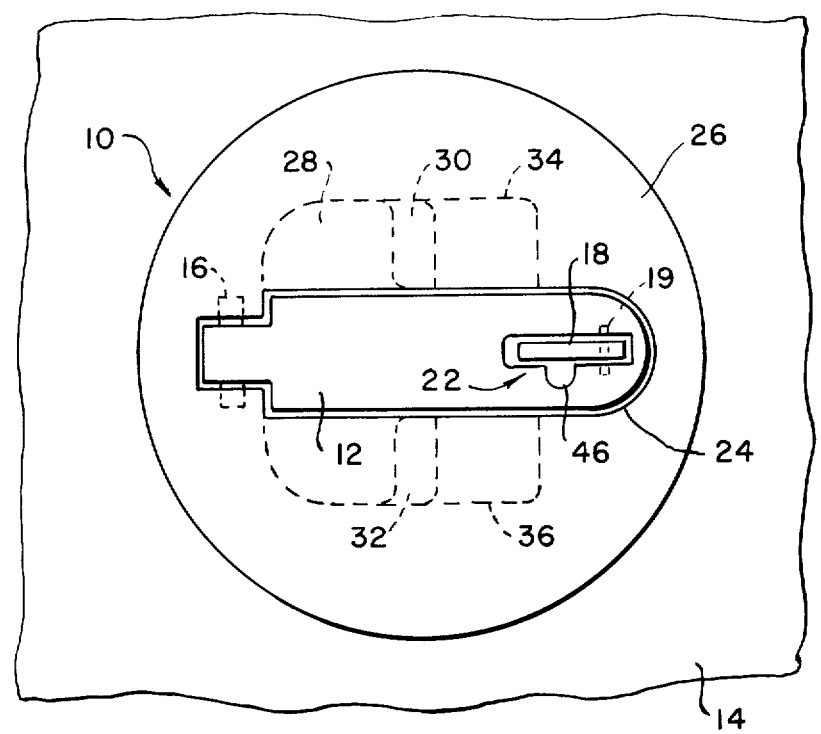
FIG. 3 is a top view of the embodiment of FIG. 1 as it appears with the cover closed and the T-bar removed.

Turning to FIG. 3, the fitting 10 is shown with the T-bar removed and its cover 12 closed. When in this position, the cover 12 is flush with top plate 26 so that the slot-type aperture 24 is sealed. The fitting is maintained in this position when not in use to prevent injuries on or obstructions to the carrier deck. A notch 46 is formed in the cover 12 to enable hooking of the aperture 22 in latch 18 to open the cover 12. The latch 18 is biased flush with the cover plate and assumes the position shown in FIG. 1 only when opening the cover plate 12.

Figures 4, 5:
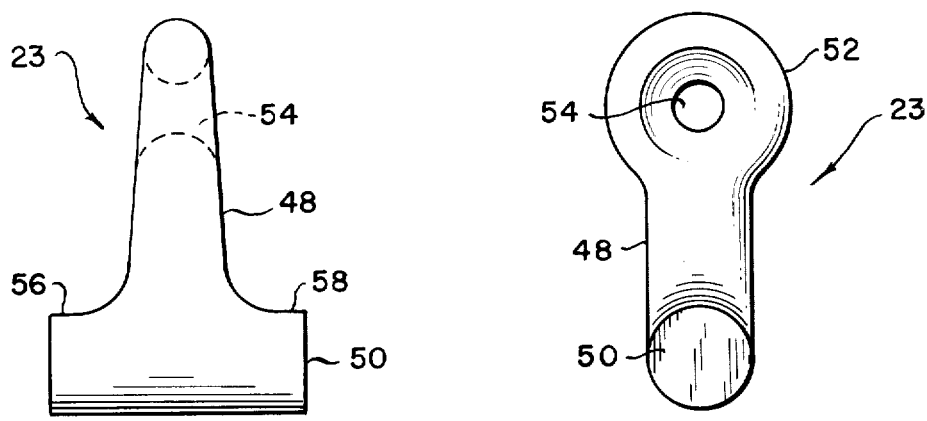
FIG. 4 is a front view of the T-bar portion of the invention.
FIG. 5 is a side view of the T-bar shown in FIG. 4.

In FIGS. 4 and 5, the T-bar 23 is shown comprising generally upstanding and cross member portions, 48 and 50 respectively, which are integrally formed. The upstanding member 48 has a donut-shaped portion 52 which includes a bore 54 to permit attaching of a chain leading to the aircraft. The cross member 50 has arms 56 and 58 which extend horizontally from the general plane of the upstanding member 48.

When assembling the anchoring device, the fitting 10 is initially in the position shown in FIG. 3. Then, the cover 12 is opened and the T-bar 23 is placed in a position shown in FIG. 4. The T-bar 23 is inserted through the slot-type aperture 24 and, after clearing lower surface 42 of the top plate 26, is rotated 90° to a position shown in FIG. 5. The T-bar 23 is pulled up inclines 30 and 32 (compare FIGS. 1 and 2) so that its arms 56 and 58 rest on seats 34 and 36 of the fitting 10. Next, the upstanding member 48 is rotated downward in the direction of arrow 51 so that its donut portion 52 contacts surface 44 of the top plate 26, as shown in FIG. 1. The anchoring device is now ready to be connected to the aircraft.

When positioned for anchoring an aircraft, the entire assembly is relatively very close to the carrier deck 14 and the pulling force is at a relatively low-angle above the plane of the flight deck, i.e. from 0° to not more than 45°. The particular construction of the anchoring device is designed to maximize the retaining strength for low-angle pulling forces. The specific design features are shown clearly in FIG. 1 wherein the cup-shaped deck fitting 10 is provided with the pair of spaced-apart inclines 30 and 32 which guide and retain the cross arm portions 56 and 58 of the T-Bar 23 in the position shown. The upstanding portion 48 adjacent the do-nut shaped portion 52 of the T-Bar 23 has a radius designed to mate with the brim of the cup-shaped deck fitting 10. When a relatively low lateral pull is exerted on the T-Bar 23, such as along the axis of the chain shown in FIG. 1, the forces are transmitted to the top plate 26 in a direction indicated by arrow 60 (FIG. 1), side walls 38 and 40 as indicated by arrow 62 (also FIG. 1), and surface 44 in a direction indicated by arrows 64. Torsional forces on the T-Bar 23 are minimal in this arrangement.

All of the parts indicated are preferably formed of forged steel, such as for example HY 80 steel.

Thus there has been described an improved apparatus for securing aircraft to a carrier during testing of the engine under full power conditions. The apparatus described may be easily assembled and disassembled to promote a high degree of safety on the carrier desk with a minimum amount of inconvenience.

Obviously, many modifications and variations of the present invention are possible in light of the above teachings. It is therefore to be understood that, within the scope of the appended claims, the invention may be practiced otherwise than as specifically described.

What is claimed is:

1. Apparatus for securing aircraft to the deck of an aircraft carrier comprising a first cup-shaped member adapted to be installed in the deck of the carrier with the upper surface of said member flush with said deck, said cup-shaped member having a movable cover portion which when opened exposes a slot type aperture leading to a receiving cavity, said receiving cavity having a seat portion which includes a pair of spaced inclines leading to the front wall of said cavity, and a second member of T-shape having integral upstanding and cross member portions, said cross member portion being of proper size to permit insertion through said slot type aperture, positioning within said receiving cavity and pulling up said inclines to contact said front wall and the underside of said upper surface, said upstanding member being rotatable downward to contact the front side of said slot type aperture, thereby providing a multipoint contact between said cup-shaped member and said T-shape member to distribute the forces throughout said cup-shaped member.

2. The apparatus of claim 1 wherein said first and second members are formed of forged steel.

3. The apparatus of claim 1 wherein said movable cover is pivotally mounted on said first member and automatically locks in position upon closing.

* * * * *